United States Patent [19]

McCalla

[11] Patent Number: 5,096,216

[45] Date of Patent: Mar. 17, 1992

[54] TRANSPORT TRAILER WITH COLLAPSIBLE SHELVES, AND METHOD OF USING SUCH TRAILER

[76] Inventor: William R. McCalla, 1104 Eagle Nest Rd., Indian River, Mich. 49749

[21] Appl. No.: 631,340

[22] Filed: Dec. 20, 1990

[51] Int. Cl.⁵ .............................................. B60P 3/10
[52] U.S. Cl. ................................ 280/414.1; 414/495; 410/24
[58] Field of Search ............. 280/414.1, 414.3, 401, 280/404, 491.1; 414/500, 540, 495; 410/24, 26

[56] References Cited

U.S. PATENT DOCUMENTS

| | | | |
|---|---|---|---|
| 3,610,431 | 10/1971 | Rodden | 280/414.1 X |
| 3,870,339 | 3/1975 | Goff | 280/414.1 |
| 4,406,477 | 9/1983 | McDonald | 280/414.1 |
| 4,932,830 | 6/1990 | Woodburn | 280/414.1 X |

FOREIGN PATENT DOCUMENTS 1369948 1/1988 U.S.S.R. ........................... 280/414.1

Primary Examiner—Charles A. Marmor
Assistant Examiner—Kevin Hurley
Attorney, Agent, or Firm—Learman & McCulloch

[57] ABSTRACT

A transport trailer structure for carrying vehicles such as canoes and other elongate loads has spaced apart carrier frames supported on a vehicle frame carried on wheels or other surface engaging members. Vertically extending fore and aft guides extend upwardly from the vehicle frame, and slide bearings on the carrier frames are vertically slideable along the vertical guide members to permit the mobile carrier frames to move from positions of loading to positions of transport, and back again for unloading. Collapsable spacers connect the carrier frames, and a cable wind-up and control system connects to the upper carrier frame at fore and aft locations and is operable to draw the upper carrier frame vertically from a lowered position in which loading of the upper carrier frame takes place to a raised transport position in which the collapsable spacers are restored to control the height to which the upper carrier frame may be raised. Each subjacent mobile carrier frame is then loaded and raised incrementally until the next carrier frame is in loading position. Unloading takes place in reverse order as the carriers are progressively lowered to unloading position.

12 Claims, 3 Drawing Sheets

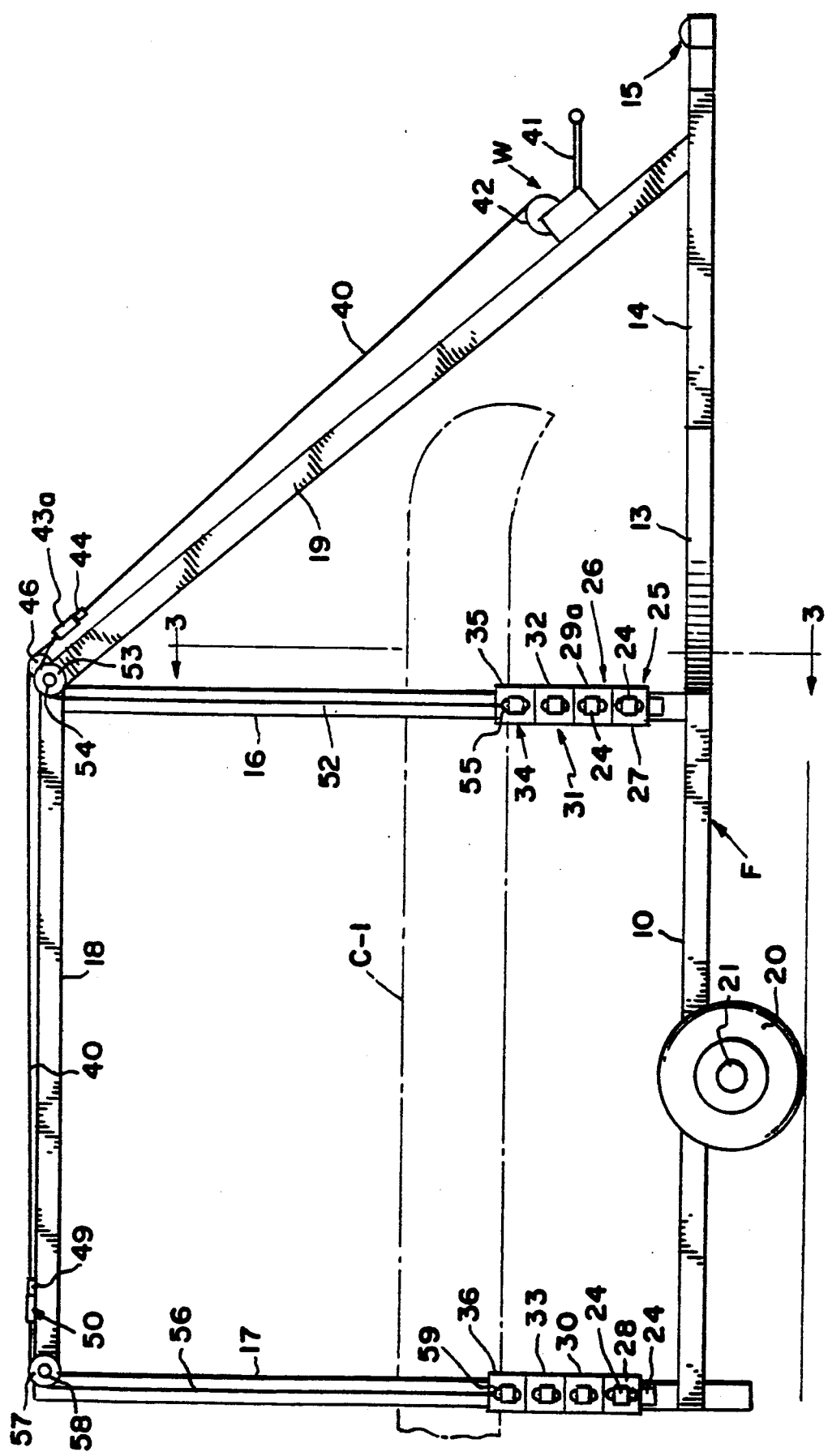

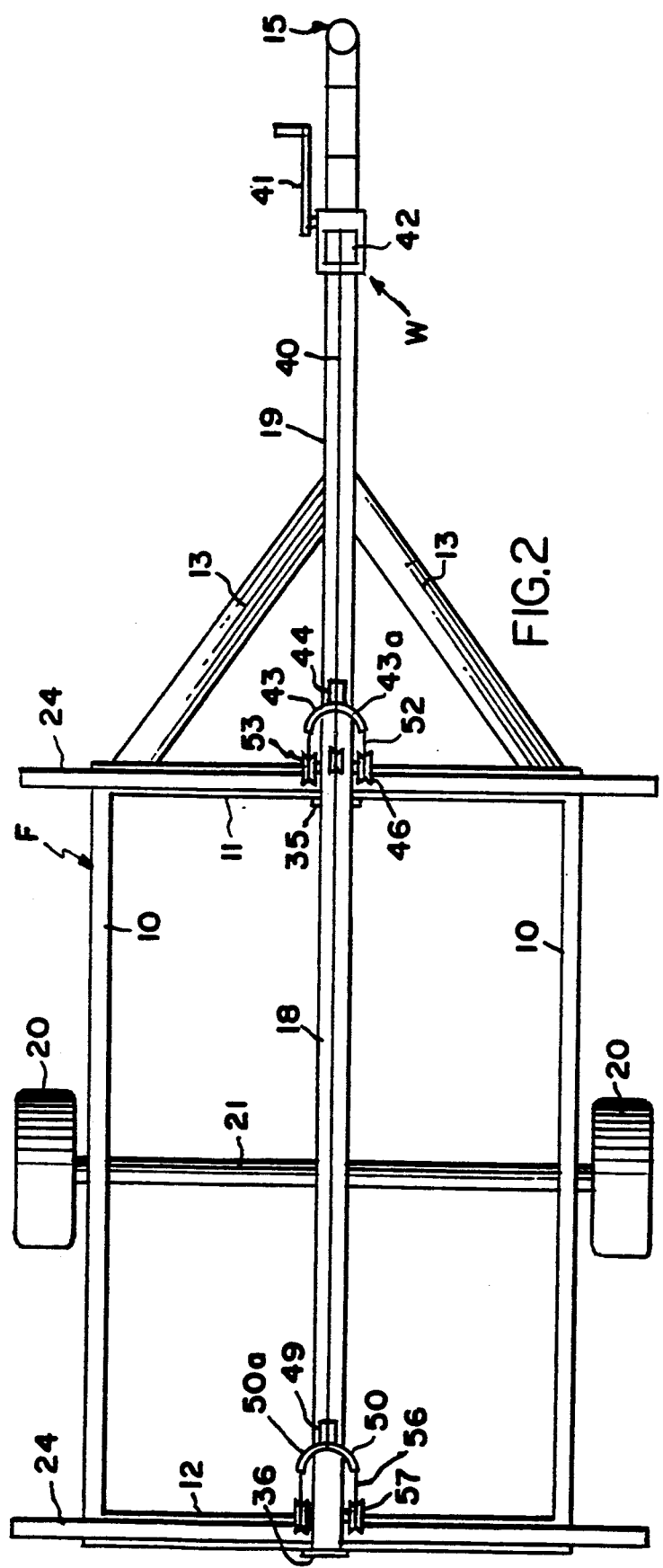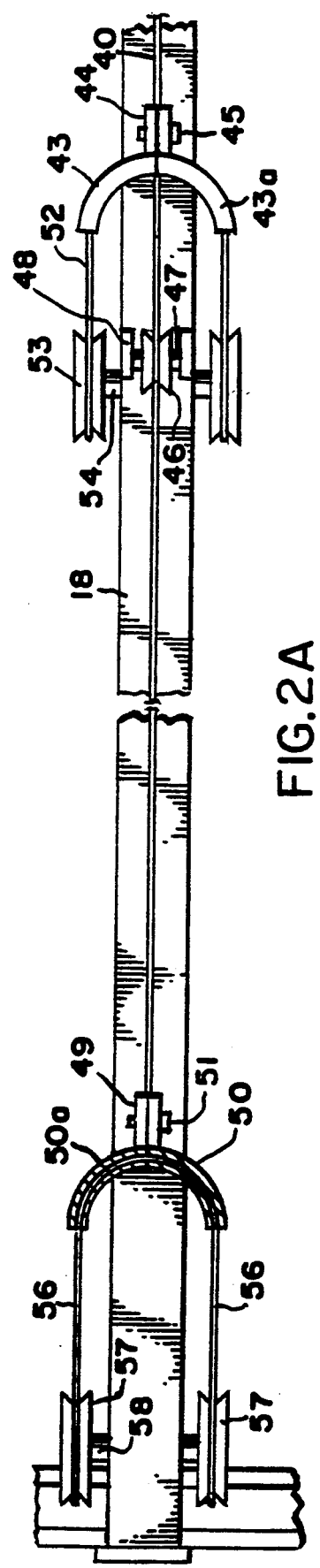

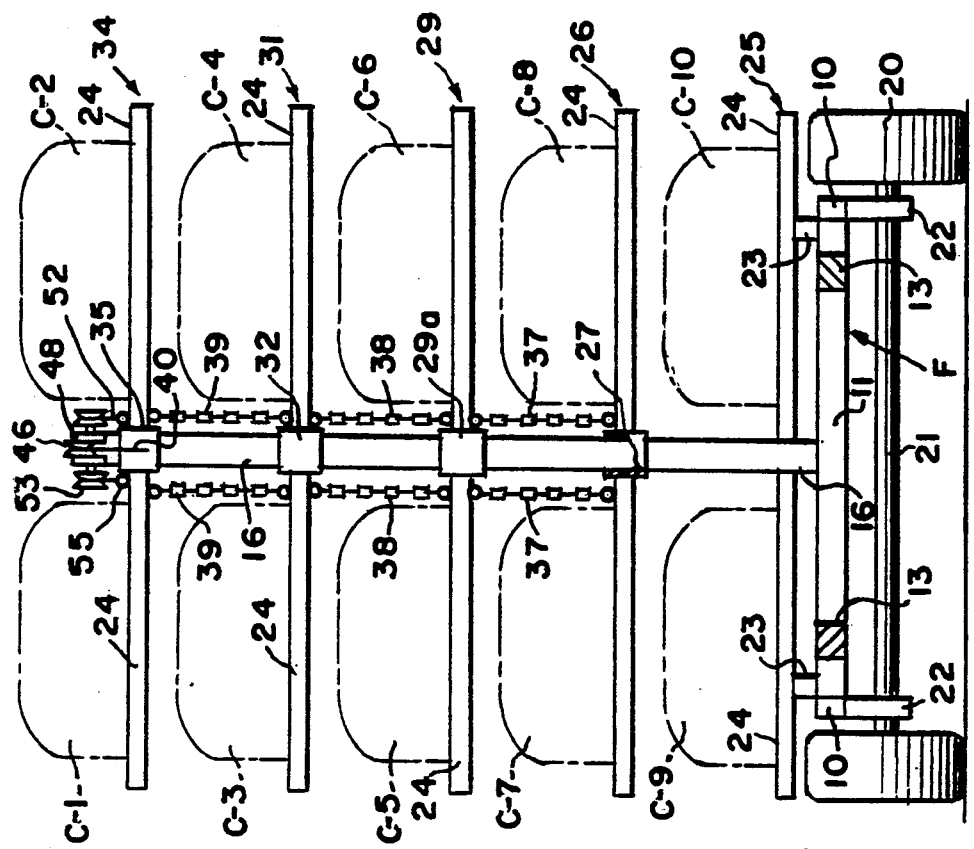
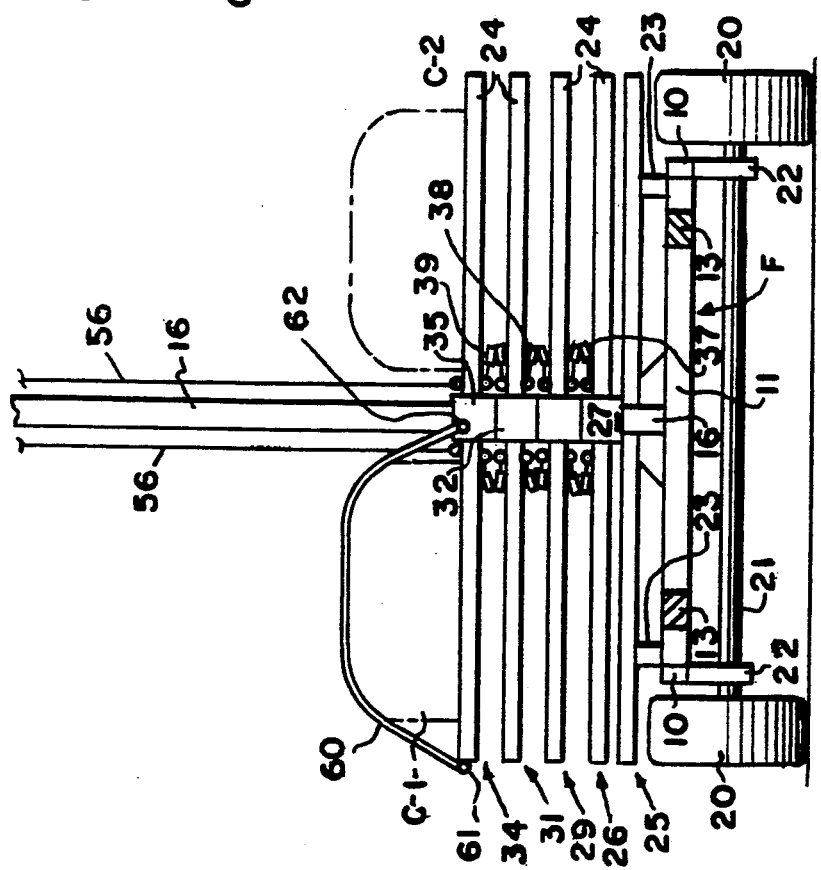

TRANSPORT TRAILER WITH COLLAPSIBLE SHELVES, AND METHOD OF USING SUCH TRAILER

TECHNICAL FIELD

The present invention relates to towable trailers for transporting a plurality of canoes, vehicles, or other elongate loads in vertically juxtaposed position.

BACKGROUND

Trailer structures of the broad character mentioned, wherein fixed vertically spaced fore and aft arms are provided for receiving canoes, are well known for transporting canoes from one site to another. It is usual for canoe liveries, for example, to simultaneously rent a number of canoes to groups of canoers who will paddle the canoes a predesignated distance on the river or other waterway to a location where they are met by the canoe livery operator and returned to the livery. Both at the time the canoers are delivered to the place of entry to the waterway, and at the time of exit, it is necessary to transport loads of canoes to and from the waterway respectively. It is necessary to load and unload the canoes or other boats or vehicles to the transport trailers each time they are rented, and to secure them in position for transport, because usually the trailers travel, at least partly on unimproved roads. Because these transport trailers are relatively tall to accommodate a goodly number of canoes, it is quite difficult to load the canoes to the uppermost racks of present day transport trailers and secure them in position for transport. Similarly it is difficult to unfasten and unload them from the uppermost racks, and both operations are presently unduly time-consuming. Prior art patents known to applicant are as follows:

| | |
|---|---|
| 2,447,959 | Phillips et al |
| 3,190,466 | Hostetler |
| 3,325,021 | Burns et al |
| 4,469,346 | Low |
| 4,701,086 | Thorndyke |
| 4,784,545 | Lawrence |
| 4,932,830 | Woodburn |

U.S. Pat. No. 4,469,346 relates to a dual load trailer in which a boat is to be supported at a level above an automotive vehicle, which is also carried by the trailer. In this patent, the boat is itself mounted on a wheeled frame and the frame is supported by pivotal uprights which must be pivoted downwardly to a position to dispose the boat supporting frame at a vertically inclined angle for release of the boat.

In U.S. Pat. No. 4,932,830, another vehicle and boat trailer is disclosed, in which an upper carrier frame is mounted for slideable vertical travel on front and rear corner uprights. In this patent a cable is attached to each corner of the frame and the four cables are joined to a common ring whose position is not laterally fixed, so that there is considerable question as to whether the platform can maintain a horizontal plane as it is raised and lowered. Moreover, one of the objects of this earlier invention is to provide means for adjusting the distance between vehicles once they are loaded into position. The concept differs greatly from the structure which will be described and claimed wherein collapsible spacers or connectors are utilized between carrier frames. It is believed that none of the prior art patents, considered either singly or combinatively, disclose or are materially pertinent to the structure which is claimed, and none of them can accomplish what is desired.

SUMMARY OF THE INVENTION

In a preferred form of the invention, the present trailer structure includes a vehicle frame, supported on wheels or other surface engaging members, which is adapted to be towed behind a motive vehicle. When canoes are to be carried, a plurality of juxtaposed carrier frames are supported for vertical movement above a lowermost fixed carrier frame on fore and aft upright members extending vertically upwardly from the vehicle frame. In this form of the invention, the carrier frames comprise a pair of fore and aft rack bars on which a canoe can be supported on each side of central uprights, and secured in position for transport. Slide bearings on the movable carrier frames guide on the uprights during their up and down movement. Collapsible spacers connect each upper carrier frame to the carrier frame immediately beneath it, and a cable wind-up and cable system connects to the upper carrier frame at fore and aft spaced locations, and is operable to raise the upper carrier frame vertically from a lowered accessible position adjacent the next uppermost carrier frame to a raised position with respect thereto, after loading of the upper carrier frame. Thereafter, each successively vertical, subjacent carrier frame is loaded and raised incrementally to the extent permitted by the collapsible spacers so that loading of each carrier frame is accomplished at a lower level in the most expeditious and time efficient manner.

One of the prime objects of the present invention is to provide a trailer for transporting canoes, for example, which permits loading, which formerly required 30 to 45 minutes to be accomplished, to be accomplished in the neighborhood of 10 minutes.

A further object of the invention is to provide a trailer structure of the character described wherein ten canoes, for example, can be transported in juxtaposed position at a proper level off the ground on fore and aft crossbars which are first loaded and then raised to transport position.

A further object of the invention is to provide a structure of the character described wherein it is only necessary to raise the rack bars constituting the upper carrier frame in increments to dispose the carrier frames beneath in properly vertically spaced, raised position.

Still a further object of the invention is to provide a trailer structure of the character described with cable wind up and cable mechanism which is connected to exert the same pull at the fore and aft ends of the carrier to raise and lower the fore and aft rack bars of the carrier frames uniformly in horizontally planar alignment.

Still a further object of the invention is to provide a very practical and efficient transport trailer which is economical to manufacture and convenient to utilize, and which is of a rigid and durable structural character.

Other objects and advantages of the invention will be pointed out specifically or will become apparent from the following description when it is considered in conjunction with the appended claims and the accompanying drawings.

DESCRIPTION OF THE DRAWINGS

In the drawings, which fully illustrate the invention, FIG. 1 is a side elevational view of the transport trailer, the chain lines illustrating a canoe in position on the uppermost carrier frame.

FIG. 2 is a top plan view thereof.

FIG. 2A is a fragmentary plan view, on an enlarged scale, more particularly illustrating certain parts of the cable operating mechanism.

FIG. 3 is a fragmentary, sectional, end elevational view, taken on the line 3—3 of FIG. 1, with the carrier frames shown in collapsed condition the chain lines indicating canoes loaded to the upper carrier frame.

FIG. 4 is a similar view showing the carrier frames in raised condition, with chain lines indicating a full complement of canoes supported thereon.

DETAILED DESCRIPTION OF THE PREFERRED EMBODIMENT

Referring now more particularly to the accompanying drawings, a transport trailer frame is shown generally at F as an open skeletal rectangular frame, comprising side members 10 connected by front and rear members 11 and 12. A pair of convergent frame members 13 connect front member 11 to a tow bar 14 on which the usual ball cap 15 is provided so that it may be attached to the ball joint coupling provided on a towing vehicle (not shown). The frame F further includes a front upright 16 and a rear upright 17, which are connected at their upper ends by a top rail member 18. It will be noted that the subframe formed by the members 16–18 is centrally longitudinally disposed with respect to frame F (see FIG. 2), and aligns longitudinally with tow bar 14. A vertically inclined support bar 19 connects the tow bar 14 with upper rail 18, and the structure formed by members 10, 11, 13, 14, and 16–19 is rigidly welded so as to be capable of supporting considerable loads.

The frame F is supported in the usual manner on wheels 20 carried by an axle 21 via the usual, schematically illustrated spring-incorporating support structure, generally designated 22, which needs no further description here. Mounted on the frame F, as shown in FIG. 3 and 4, on supports 23 is a vertically fixed carrier frame 25 comprising transversely extending rack bars 24, fixed to the uprights 16 and 17 at their inner ends. The lowermost carrier frame, formed by the two rack bars 24 which secure to upright 16, and the two rack bars 24 in longitudinal alignment therewith which secure to the rear upright 17, is a fixed carrier frame which is generally designated 25. The next uppermost carrier frame, generally designated 26, is formed by a slide bearing 27 on each upright 16, from which support bars 24 horizontally extend laterally, and a slide bearing 28 on upright 17 from which a pair of rack bars 24 likewise extend laterally. On each of the carrier frames which have been and will be described, the fore and aft rack bars 24 are horizontally aligned, and, as will be understood, this horizontal disposition in a fore to aft direction is maintained during the raising and lowering movement of the respective carrier frames. Above carrier frame 26 is a carrier frame 29, formed by the slide bearings 29a and 30 received on the uprights 16 and 17, respectively, and the rack bars 24 which extend laterally therefrom. Above carrier frame 29 is a carrier frame, generally designated 31, formed by a slide bearing 32 on the upright 16 and a slide bearing 33 on the upright 17 each of the slide bearings 32 and 33 similarly having a pair of laterally projecting rack bars 24. Finally, above carrier frame 31, is an uppermost carrier frame, generally designated 34, formed by slide bearings 35 and 36 supported for vertical travel on the uprights 16 and 17, respectively.

As FIG. 4 particularly indicates, a pair of spacer chains 37 connect at their terminal ends to the inner ends of the rack bars 24 of carrier frame 26 and carrier frame 29. Similarly, chains 38 connect at their terminal ends to the rack bars 24 of carriers 29 and 31 and chains 39 connect at their terminal ends to the rack bars 24 of carrier frames 31 and 34.

Operative means, for moving the upper carrier frame 34 incrementally from the position in which it is shown in FIG. 3 to the position in which it is shown in FIG. 4, preferably includes a conventional winch, generally designated W, upon which a cable 40 is wound. A handle 41 may be used to revolve the winch drum 42 and wind the cable 40 thereon to move the carriers upwardly in loading increments from the position in which they are shown in FIGS. 1 and 3 to the positions in which they are shown in FIG. 4.

As FIG. 2a particularly indicates a curvilinear tubular guide 43, formed by mating halves 43a, has mating clamp plates 44 secured by a bolt and nut assembly 45, which fixes the curvilinear guide 43 to the cable 40. Cable 40 passes over a pulley 46 which is rotatable on a shaft 47 supported by posts 48 fixed to top frame member 18. At its rear terminal end cable 40 is similarly received between the mating clamp plates 49 provided on the curvilinear tubular guide member halves 50a of guide 50 which is fixedly secured to the rear end of cable 40 by the bolt and nut assembly 51. A second cable 52, which extends through cable guide 43, is trained around pulleys 53 rotatably mounted on shafts 54 extended laterally from frame member 18. The terminal ends of cable 52 secure as at 55 to the upper rack bars 24 of upper carrier frame 34 adjacent to the slide block 35. As shown in FIGS. 3 and 4, similarly, a third cable 56, which extends through curvilinear guide 50 is trained around revolvable pulleys 57 mounted on shafts 58 extending laterally from the rear end of the upper frame bar 18. The terminal ends of cable 56 similarly are fixed to the rack bars 24 at the rear of carrier frame 34 as at 59.

THE OPERATION

Assuming that the transport trailer is in the collapsed condition illustrated in FIG. 3, it is the upper carrier frame 34 which is first loaded at a level which is convenient. At the left, in FIG. 3, a canoe C-1 is shown as having been loaded and removably secured in position by bungee cords 60 which are hooked to eye members 61 and 62 provided on the rack bars 24 and slide bearing 35 for this purpose. A second canoe can then be loaded to the opposite side of the upper carrier frame 34 as at C-2. When this has been accomplished, and canoe C-2 has been secured by suitable bungee cords or the like, the winch drum 42 is revolved to wind cable 40 thereon. The guides 43 and 50 are simultaneously moved from left to right in FIGS. 2 and 2a until the chains 39 are taut and the rack bars 24 of the upper carrier frame 34 are supported at the predesignated distance above the rack bars 24 of the next uppermost carrier frame 31 shown in FIG. 4. Thereafter carrier frame 31 is loaded with canoes C-3 and C-4 and the winch drum 42 is further revolved until chains 38 are taut and the rack bars 24 of carrier frame 31 are the predesignated distance above the rack bars 24 of carrier frame 29. After this, the rack bars 24 of carrier frame 29 are loaded with canoes C-5 and C-6, after which winch drum 42 is further revolved until the chains 37 are taut and the rack bars 24 of carrier frame 29 are spaced the predetermined distance above the rack bars 24 of the carrier frame 26. Thence, canoes C-7 and C-8 are loaded to the carrier frame 26, and canoes C-9 and C-10 are loaded to the rack bars 24 of fixed carrier frame 25. The spacer chains 37-39 function to place the carriers at a proper level for convenient loading.

The unloading operation is performed in reverse. With the transport trailer in the transport position shown in FIG. 4, the canoes C-9 and C-10 are first unloaded, after which the winch drum 42 is unlocked and permitted to revolve in the opposite direction to drop the rack bars 24 of the carrier frame 26 into the position in which they are shown in FIG. 3. Thence the canoes C-7 and C-8 are unloaded. After this, the drum 42 is unwound in a direction to lower carrier frame 29 to the position in which it is shown in FIG. 3 and collapse the chains 37. Then, canoes C-5 and C-6 are unloaded and winch drum 42 can be unwound in a direction to release cable 40 and lower carrier frame 31 from the position in which it is shown in FIG. 4 to the position in which it is shown in FIG. 3, and collapse the chains 38. At this time, canoes C-3 and C-4 can be unloaded at a convenient level. Finally, upper carrier frame 34 can be lowered by revolving the drum 42 to release cable 40 and collapse the chains 39, after which canoes C-1 and C-2 can be unloaded. The slide blocks 27, 29a, 32 and 35 function to properly space the carriers for easy unloading. With the cable guides 43 and 50 moving simultaneously in unison, the fore and aft rack bars 24 of each carrier from are moved upwardly and downwardly in unison in a horizontal plane.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

What is claimed is:

1. In a transport trailer structure to be drawn by a vehicle, the combination of:
   a. a vehicle frame having fore and aft ends supported on wheels or other ground engaging members for transport;
   b. at least one upper carrier frame and a subjacent carrier frame on which elongate transportation vehicles and loads can be carried in vertically juxtaposed relation;
   c. fore to aft spaced vertical guide members extending upwardly from said vehicle frame;
   d. fore and aft slide bearings on said upper carrier frame slidable along said vertical guide members to guide said upper carrier frame in up and down movement;
   e. collapsible spacers connecting said upper carrier frame to said subjacent carrier frame;
   f. and cable wind up and cable mechanism connected to the upper carrier frame at fore and aft spaced locations and operable to draw said upper carrier frame vertically from a lowered position adjacent the subjacent carrier frame in which loading of said upper carrier takes place to a raised position with respect thereto in which said collapsible spacer means is restored to control the height to which said upper carrier frame may be raised above said subjacent carrier frame to permit loading of the subjacent carrier frame.
   g. and means incorporated with said cable wind up and cable mechanism connected to exert the same pull at the fore and aft connections as said cable is wound on said wind up mechanism to raise said upper frame uniformly in unison at its fore and aft ends.

2. The structure defined in claim 1 wherein said cable wind up and cable mechanism comprises a fore and a rear cable guide device and a frame mounted winch with a first cable wound thereon and extending rearwardly to fixedly connect to said fore cable guide device and then to said rear cable guide device, said cable guide devices having second and third separate cables connected with the upper carrier frame in a manner to raise said upper carrier frame when said first cable is wound on said winch.

3. The structure defined in claim 2 wherein each said cable guide device is a tubular U-shaped guide through which said second and third cables respectively extend, each of said second and third cables having terminal ends fixedly connecting to the fore and aft ends of said upper carrier frame at transversely spaced locations on opposite sides of said vertical guide members.

4. The structure defined in claim 1 wherein said collapsible spacers comprise flexible lengths which tauten when extended to full length.

5. The structure defined in claim 1 wherein a third carrier frame is provided on said vehicle frame under said subjacent carrier frame, said collapsible spacers connecting said upper and subjacent carrier frames and said subjacent and third carrier frames.

6. The structure defined in claim 5 wherein still an additional vertically slideable carrier frame is provided on said vehicle frame beneath said third carrier frame and a lowermost carrier frame is fixed on said vehicle frame, there being collapsible spacers connecting said additional carrier frame with said third carrier frame.

7. The structure defined in claim 6 wherein said spacers are lengths of chain.

8. The structure defined in claim 7 wherein said cable wind up and cable mechanism comprises a fore and aft cable guide device and a frame mounted winch with a first cable wound thereon and extending rearwardly to fixedly connect to said cable guide devices at the fore and aft ends of said upper carrier frame, and wherein each cable guide device has a separate cable connected with the upper carrier frame in a manner to raise the upper carrier frame when the first cable is wound on said winch; each said cable guide device having a tubular U-shaped guide through which said separate cable extends with each end of each of said separate cables having terminal ends fixedly connected to the fore and aft ends respectively of said upper carrier frame.

9. A method of loading vehicles and other loads to a transport trailer structure to be drawn by a vehicle, the trailer structure comprising a vehicle frame having fore and aft ends supported on wheels or other surface engaging members for transport; there being a plurality of carrier frames mounted on said vehicle frame on which elongate loads can be carried in vertically juxtaposed relation including an upper carrier frame and a lower carrier frame, there being fore to aft spaced vertical guides extending upwardly from the vehicle frame and slide bearings on the carrier frames slideable vertically along said vertical guide members, there being also collapsible spacers connecting said upper carrier frame to the next uppermost carrier frame and connecting the next uppermost carrier frame to the carrier frame beneath it, there further being operative means actuable to draw the upper carrier frame vertically from a lowered position to a raised position, the steps of:

a. loading a vehicle or other elongate load to said uppermost carrier frame;
  b. operating said operative means to raise said upper carrier frame to the level permitted by extending said collapsible spacers connecting the uppermost and next uppermost carriers to taut condition and thereby raising the next uppermost carrier frame to loading position;
  c. loading the next uppermost carrier frame;
  d. operating said operative means to raise said uppermost carrier frame a predetermined distance and thereby raising said next uppermost carrier frame to the level permitted by extending said collapsible spacers connecting the next uppermost carrier frame with the carrier frame immediately beneath it and thereby raising the carrier frame beneath said next uppermost carrier frame to loading position.

10. The method of claim 9 wherein:

a. said operable means is actuated to lower said uppermost carrier frame to a predetermined level and thereby collapse the collapsible means connecting the carrier frame beneath said next uppermost carrier frame and said carrier frame beneath it;
  b. said carrier frame beneath said next uppermost carrier frame is then unloaded;
  c. said operative means is then actuated to lower said uppermost carrier frame a second increment to collapse the collapsible spacers connecting said upper carrier frame with the next uppermost carrier frame;
  d. said next uppermost carrier frame is then unloaded;
  e. said operative means is actuated to lower said upper carrier frame a predetermined increment to collapse the collapsible spacer means connecting the upper carrier frame with the next uppermost carrier frame; and
  f. said upper carrier frame is then unloaded.

11. In a transport trailer to be drawn by a vehicle
  a. a vehicle frame having fore and aft ends supported on wheels or other ground engaging members for transport;
  b. an upper carrier frame and a subjacent carrier rack on which canoes and the like car be carried in vertically juxtaposed relation;
  c. front and rear longitudinally spaced vertical guide members extending upwardly from said vehicle frame;
  d. fore and aft slide bearings on said upper carrier rack slidable along said vertical guide members to guide said upper carrier rack in up and down movement;
  e. collapsible spacer lengths connecting said upper carrier rack to said subjacent carrier rack; and
  f. operating mechanism connected to the upper carrier rack and operable to draw said upper carrier rack vertically from a lowered position adjacent the subjacent carrier frame in which loading of said upper carrier rack takes place to a raised position with respect thereto in which said collapsible spacer lengths are restored to control the height to which said upper carrier rack may be raised above said subjacent carrier rack to permit loading of the subjacent carrier frame.

12. In a transport trailer to be drawn by a vehicle, the combination of:
  a. a longitudinally extending vehicle frame having fore and aft ends supported on wheels or other ground engaging members for transport;
  b. at least one upper carrier rack and a subjacent carrier rack on which canoes and like loads can be carried in vertically juxtaposed relation;
  c. fore to aft spaced vertical guide members extending upwardly longitudinally centrally from said vehicle frame;
  d. fore and aft slide bearings on said upper carrier rack slideable along said vertical guide members to guide said upper carrier rack in up and down movement;
  e. and cable wind up and cable mechanism connected to the upper carrier rack at fore and aft spaced locations and operable to draw said upper carrier rack vertically from a lowered position adjacent the subjacent carrier frame in which loading of said upper carrier rack takes place to a raised position with respect thereto to permit loading of the carrier frame, said cable wind up and cable mechanism comprising a fore and aft cable guide device and a frame mounted winch with a first cable wound thereon and extending rearwardly to fixedly connect to said cable guide devices at the fore and aft ends of said upper carrier rack, and wherein each cable guide device has a separate cable connected with the upper carrier rack in a manner to raise the upper carrier rack when the first cable is wound on said winch; each said cable guide device having a tubular U-shaped guide through which said separate cable extends with each end of each of said separate cables having terminal ends fixedly connected to the fore and aft ends respectively of said upper carrier rack.

* * * * *

UNITED STATES PATENT AND TRADEMARK OFFICE
CERTIFICATE OF CORRECTION

PATENT NO. : 5,096,216
DATED : March 17, 1992
INVENTOR(S) : William R. McCalla

It is certified that error appears in the above-identified patent and that said Letters Patent is hereby corrected as shown below:

In column 7, line 56, change "car" to -- can --.

Signed and Sealed this

Fifteenth Day of June, 1993

Attest:

MICHAEL K. KIRK

Attesting Officer

Acting Commissioner of Patents and Trademarks